United States Patent Office
>
> 2,987,538
> Patented June 6, 1961

2,987,538
PRODUCTION OF TEREPHTHALONITRILE AND ISOPHTHALONITRILE
Edward James Gasson, Epsom Downs, England, assignor to The Distillers Company Limited, Edinburgh, Scotland, a British company
No Drawing. Filed Oct. 23, 1957, Ser. No. 691,794
Claims priority, application Great Britain Nov. 10, 1956
6 Claims. (Cl. 260—465)

The present invention relates to the production of aromatic nitriles and/or imides by the reaction of alkyl substituted aromatic compounds or their mono-halo derivatives with ammonia and molecular oxygen.

The production of nitriles and/or imides by the catalysed reaction of alkyl substituted aromatic hydrocarbons or their nuclear substituted mono-halo derivatives with ammonia and molecular oxygen at elevated temperatures in the vapour phase has already been proposed. A large number of materials including vanadium oxide, chromium oxide, and mixtures thereof have been suggested for use as catalysts in this reaction, but only a few catalysts have given high yields combined with good efficiencies.

It is an object of the present invention to provide an improved process using a new catalyst for this reaction which gives high yields of nitriles and/or imides combined with good efficiency for conversion from alkyl substituted aromatic hydrocarbons or their nuclear mono-halo derivatives.

According to the present invention the process comprises contacting at an elevated temperature a mixture in the vapour phase of an alkyl substituted aromatic hydrocarbon or its nuclear substituted mono-halo derivative, ammonia and molecular oxygen with a catalyst comprising vanadium oxide and chromium oxide deposited on activated alumina.

In the preparation of the catalyst the vanadium oxide and the chromium oxide are deposited on the activated alumina support in any suitable manner. Suitably the two oxides are co-precipitated from a mixed solution of their salts, for instance by evaporating a solution of vanadyl oxalate and chromium oxalate on to the activated alumina. The catalyst is then heated in air at about 350–400° C. to convert the oxalates to the respective oxides. It is not known whether the two oxides occur separately in the catalyst prepared in this way or as a combined form such as chromium vanadate. The relative proportions of vanadium to chromium may be varied considerably, but in a preferred embodiment the atomic ratio of vanadium to chromium is between 1:1 and 1:2. The proportions of vanadium and chromium oxides relative to the activated alumina may also be varied considerably, for instance proportions between 1 and 15% and preferably about 5–10% of each component, based on the weight of the total catalyst, may be used.

In a particularly preferred embodiment the mixture of vanadium and chromium oxides is deposited on activated alumina which has previously been heated to a temperature in the range of 1000° to 1500° C. The heat treatment is suitably carried out in air, for instance for a period of upwards of three hours.

In order to facilitate heat dispersion in the highly exothermic reaction, granules of an inert diluting material such as brick, pumice, carborundum and the like may be mixed with the granules of active catalyst. This provides a convenient means for regulating the heat output per unit volume of reactor.

The alkyl substituted aromatic hydrocarbons or their nuclear substituted mono-halo derivatives suitable for conversion into nitriles by the process of the present invention are benzene or naphthalene or their mono-halo derivatives, substituted by at least one group represented by the formula

where $R^1$, $R^2$ and $R^3$ each represent a hydrogen atom, a lower alkyl group or a lower alkenyl group. Examples of specific alkyl substituted aromatic hydrocarbons or their mono-halo derivatives which may be used are toluene and ethyl benzene, which are converted to benzonitrile; ortho-xylene which is converted to phthalimide, ortho-tolunitrile and phthalonitrile; meta-xylene, which is converted to isophthalonitrile and meta-tolunitrile; para-xylene, which is converted to terephthalonitrile and para-tolunitrile; mesitylene, which is converted to tricyanobenzene; ortho, meta and para-diisopropylbenzene; ortho, meta, and para-cymene, chloro-toluene; and alpha and beta methyl naphthalene.

The reaction may be carried out over a moderately wide temperature range, for instance between 300° and 500° C., and preferably between 330 and 420° C. The contact time may likewise vary, but I have found that contact times of between 0.25 and 20 seconds are suitable. To obtain the higher yields I have found that the temperature of heat treatment of the catalyst support, contact time and the reaction temperature must be carefully chosen. Thus the higher the temperature of heat treatment of the catalyst support the less active will be the resulting catalyst, i.e. the least active catalysts are produced by heating at about 1500° C., and the most active catalysts are produced by not heating the support at all or by heating at a lower temperature such as between 500 and 1000° C. With the more active catalysts it is necessary to use the less severe reaction conditions of contact time and reaction temperature in the ranges set out above, and vice versa. The contact time and reaction temperature are similarly adjusted to give the highest yields, the longer contact times being used with the lower reaction temperatures in the ranges set out above, and vice versa. Preferably a catalyst heat treatment and reaction temperatures should be chosen to give a contact time of the order of 0.5 to 5 seconds.

For the process according to the invention the known method of vapour phase catalysts may be applied. The catalyst may be a stationary or moving bed, and in view of the high heat output and the necessity of keeping good control of the temperature, a fluidised bed method may be of special advantage.

The concentration of oxygen in the reaction mixture may vary within wide limits. Generally it is preferred to feed to the reactor a gas mixture containing at least 5% of oxygen, and at least 3 moles of oxygen per mole of hydrocarbon. Such a mixture may be, for instance, air or mixture of air with oxygen. The ratio of ammonia to the alkyl substituted aromatic hydrocarbon in the reaction mixture may vary within wide limits. It is, however, preferred to use at least twice the theoretical amount of ammonia for the stoichiometic reaction, i.e. at least 2 moles of ammonia per mole of hydrocarbon where a mono-nitrile or imide is being formed, and at least 4 moles of ammonia per mole of hydrocarbon where the desired product is a dinitrile. In a particularly preferred embodiment in which the starting material is m-xylene a ratio of about 8 moles of ammonia per mole of xylene, is used.

The concentration of alkyl-substituted aromatic hydrocarbon or the mono-halo derivative in the mixture of reactants is preferably kept low and it is desirable to use concentrations not higher than about 2% by volume of the total gaseous reaction mixture; 1½% by volume is preferred. If higher concentrations than this are used explosive mixtures of hydrocarbon and oxygen may be built up. The aromatic nitriles and/or imides produced in the process of the present invention may be recovered by conventional means, for instance by cooling the hot gases to temperatures at which the nitriles will be deposited as liquids or as solids as the case may be, and can be dried in the usual manner.

The following examples illustrate ways in which the process of the present invention may be carried out in practice. In the examples the parts by weight and parts by volume bear the same relationship to each other as do kilograms to litres.

EXAMPLE 1

A catalyst was prepared as follows:

Activated alumina (8 to 16 mesh B.S.S.) was heated for approximately 22 hours at 1400° C. 1.25 parts by weight of powdered vanadium pentoxide was suspended in 4 parts by volume of distilled water. The suspension was heated to 90° C. and oxalic acid was gradually added until the vanadium pentoxide was completely reduced and then dissolved to give a blue solution of vanadyl oxalate. 1.4 parts by weight of chromium tri-oxide were suspended in 4 parts by volume of water, and the suspension heated with excess of oxalic acid until a solution of chromic oxalate was obtained. The two oxalate solutions were mixed, poured over 25 parts by weight of the heat treated alumina, and the whole evaporated to dryness at about 100° C. with frequent stirring. The product was heated in a stream of air at 400° C. for 16 hours to oxidise the oxalates to the respective oxides. This catalyst contained at atomic ratio of vanadium to chromium of 1:1.

A series of processes were carried out at different reaction temperatures using this catalyst. The appropriate quantity of catalyst was placed in a U-shaped Pyrex glass tubular reactor, heated by a liquid bath and through it was passed the pre-heated mixture of para-xylene, ammonia and air. The para-xylene was present in a proportion of 1½% by volume of the total reaction mixture. The molar ratio of ammonia to xylene was 8:1. The contact time was 3 seconds. The product gases leaving the reactor were passed into a large air cooled receiver in which the terephthalonitrile was deposited as a white solid.

The results are shown in Table 1.

Table 1

| Run No. | Reaction Temp., ° C. | Percent Yield Terephthalonitrile | Percent Yield Para-tolunitrile | Percent Yield Carbon dioxide |
|---|---|---|---|---|
| 1 | 390 | 71 | 18.5 | 1 |
| 2 | 400 | 83.5 |  | 3 |
| 3 | 410 | 84.5 |  | 3.5 |
| 4 | 420 | 80 |  | 4 |

EXAMPLE 2

The process of Example 1 was repeated using meta-xylene instead of para-xylene. The results are shown in Table 2.

Table 2

| Run No. | Reaction Temp., ° C. | Percent Yield Isophthalonitrile | Percent Yield Meta-tolunitrile | Percent Yield Carbon dioxide |
|---|---|---|---|---|
| 1 | 409 | 71 | 12.5 | 3.5 |
| 2 | 410 | 67.5 | 14.5 | 4.5 |
| 3 | 414 | 82 | 8.5 | 3 |
| 4 | 420 | 84 |  | 5 |
| 5 | 430 | 76 | .1 | 7 |
| 6 | 440 | 42.5 |  | 15 |

The results shown in Tables 1 and 2 illustrate the very high yields of aromatic nitriles that are obtainable by the process of the present invention.

I claim:

1. The process for the production of a compound selected from the group consisting of terephthalonitrile and isophthalonitrile which comprises contacting at a temperature between 300–500° C. a gas mixture containing a hydrocarbon selected from the group consisting of meta-xylene and para-xylene, said gas mixture comprising not more than 2% by volume of said hydrocarbon, at least 3 moles of oxygen per mole of hydrocarbon and at least twice the theoretical ratio of ammonia for the stoichiometric reaction, with a catalyst consisting essentially of vanadium oxide and chromium oxide deposited on activated alumina which has been heat treated prior to deposition of the catalyst thereon to a temperature in the range of 1,000 to 1,500° C., the atomic ratio of the vanadium to chromium in the catalyst lying between 1:1 and 1:2.

2. The process of claim 1, in which the hydrocarbon is meta-xylene and the compound produced is isophthalonitrile.

3. The process as claimed in claim 1 wherein the catalyst contains between 1 and 15% of each of the vanadium and chromium oxides based on the weight of the total catalyst.

4. The process as claimed in claim 3 wherein the catalyst contains between 5 and 10% of each of the vanadium and chromium oxides based on the weight of the total catalyst.

5. The process as claimed in claim 1 wherein the hydrocarbon is para-xylene.

6. The process as claimed in claim 2 wherein the ratio of ammonia to m-xylene is about 8:1.

References Cited in the file of this patent

UNITED STATES PATENTS

| | | |
|---|---|---|
| 1,450,678 | Gibbs | Apr. 3, 1923 |
| 2,054,088 | Linstead | Sept. 15, 1936 |
| 2,784,212 | Farkas et al. | Mar. 5, 1957 |
| 2,784,213 | Farkas et al. | Mar. 5, 1957 |
| 2,816,908 | Aries | Dec. 17, 1957 |
| 2,838,558 | Hadley et al. | June 10, 1958 |

OTHER REFERENCES

Mahan et al.: abstract of application Serial Number 120,606, published June 5, 1951, 647 O.G. 311.